No. 729,056. PATENTED MAY 26, 1903.
G. F. FRALEY.
AIR CHECK FOR PHOTOGRAPHIC SHUTTERS.
APPLICATION FILED JAN. 15, 1903.
NO MODEL.
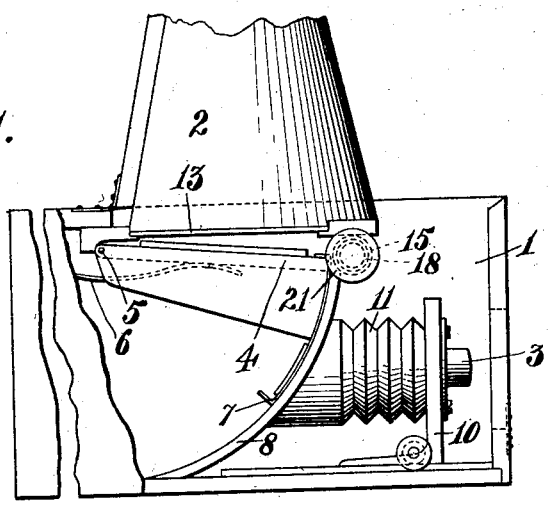
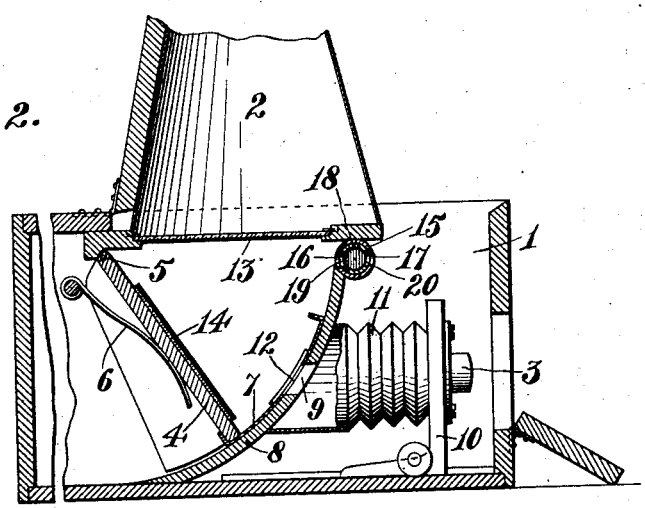
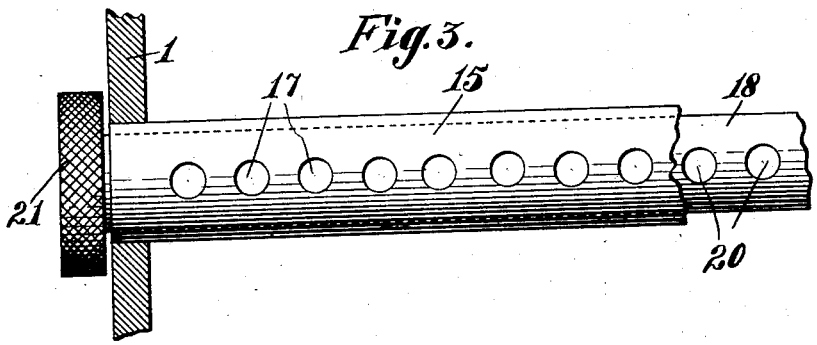
Witnesses:
F. G. Hackenberg
Henry Thieme
Inventor:
George F. Fraley
by attorneys No. 729,056. Patented May 26, 1903.

UNITED STATES PATENT OFFICE.

GASSNER F. FRALEY, OF NEW YORK, N. Y., ASSIGNOR TO PATRICK H. BETTMAN, OF CHICAGO, ILLINOIS.

AIR-CHECK FOR PHOTOGRAPHIC SHUTTERS.

SPECIFICATION forming part of Letters Patent No. 729,056, dated May 26, 1903.

Application filed January 15, 1903. Serial No. 139,097. (No model.)

*To all whom it may concern:*

Be it known that I, GASSNER F. FRALEY, a citizen of the United States, and a resident of the borough of Manhattan, in the city and State of New York, have invented a new and useful Air-Check for Photographic Shutters, of which the following is a specification.

My invention relates to cameras, and has for one of its objects to provide a pneumatic cushion for the swinging shutter-operating plate.

A further object is to provide means for adjusting the pneumatic cushion so as to control the speed of the plate as well as cushioning the same.

A still further object is to provide a very simple, inexpensive, and efficient means for carrying out the above objects.

A practical embodiment of my invention is represented in the accompanying drawings, in which—

Figure 1 represents a partial side view of a photographic camera with my improvement applied thereto, a portion of the side wall nearest the observer being removed to more clearly illustrate the interior of the camera-box and the shutter-operating plate being shown at the limit of its upward movement. Fig. 2 is a vertical longitudinal section through the portion of the camera which will give a clear understanding of my invention, the swinging shutter-operating plate being shown at the limit of its downward movement; and Fig. 3 is an enlarged detail view showing the device which I have illustrated herein for adjusting the pneumatic cushioning of the shutter-operating plate.

The camera-box is denoted by 1, and it may be made of the desired shape and size. A suitable hood 2 is provided on the camera for use of the operator in finding the image through the lens 3. A swinging shutter-operating plate 4 is hinged at 5 to swing vertically within the camera-box, and a spring 6 is provided for normally swinging the plate to the limit of its upward movement when released. A curved shutter 7 is fitted to have a short vertically-sliding movement on the concave face of a curved transverse wall 8 within the camera-box, the said shutter and wall being curved, with the pivot 5 of the plate 4 as the center of curvature. The wall 8 is provided with an aperture 9 in alinement with the lens 3. The lens-holder 10 may be connected to the convex front of the wall 8 by means of the usual flexible hood or bellows 11. The shutter 7 is provided with an aperture 12, which is brought into and out of alinement with the aperture 9 in the wall 8 as its operating-plate 4 is swung to the limits of its downward and upward swinging movements.

A pane of ground glass 13 is located immediately beneath the hood 2, and the shutter-operating plate 4 is provided on its front face with a mirror 14, so that when the plate 4 is at the limit of its downward movement the mirror will be in position to reflect the image disclosed through the lens 3 onto the said ground glass 13.

I may employ any suitable means for operating the swinging plate 4, and thereby the shutter 7—such, for instance, as the mechanism shown, described, and claimed by me in my Letters Patent No. 666,006, granted January 15, 1901, for improvement in photographic shutters. As this means forms no part of the present invention, it has been omitted from the accompanying drawings.

The means which I have shown herein for cushioning the shutter-operating plate 4 is constructed, arranged, and operated as follows: A stationary cylinder 15 is secured at its opposite ends in the side walls of the camera-box 1, which cylinder is provided with one or more perforations through each of its side walls. In the present instance a plurality of perforations 16 are provided along its inner wall for opening communication from the space between the plate 4 and ground glass 13 into the interior of the cylinder and a series of perforations 17 through the outer wall of the cylinder for opening communication from the interior of the cylinder to the exterior. A rotary cylinder 18 is fitted within the stationary cylinder 15, the ends of which rotary cylinder are closed. This rotary cylinder 18 is provided with one or more projections in each of its side walls. In the present instance this cylinder is provided along its inner side wall with a series of perforations 19, fitted to be brought into and out of alinement with the perforations 16 in the stationary cylinder, and with a plurality of perforations 20 through its outer side wall, fitted to be brought into and out of alinement with the perforation 17 in the outer wall of the stationary cylinder. This rotary cylinder 18 is provided at one end, exterior to the camera-box 1, with a suitable operating-handle 21. Because of the reduced opening through which the air within the space between the plate 4 and ground glass 13 must escape the plate 4 is cushioned as it swings upwardly under the tension of the spring 6, so as to prevent jarring the camera and also for preventing the liability of breakage of the parts.

The rapidity with which the shutter-operating plate 4 will swing upwardly may be accurately controlled by turning the rotary cylinder 18 to a greater or lesser extent, so as to increase or diminish the area of the outlet for the air.

The plate or film holder has not been illustrated in the accompanying drawings; but it is to be understood that it may be inserted back of the swinging plate 4 in any suitable manner.

It is evident that changes might be resorted to in the construction, form, and arrangement of the several parts without departing from the spirit and scope of my invention. Hence I do not wish to limit myself strictly to the structure herein set forth; but

What I claim is—

1. In a camera, a swinging shutter-operating plate, a chamber within which the plate is fitted to swing provided with an air-passage leading to the exterior of the camera and means for increasing or diminishing the size of the passage, at pleasure, for regulating the speed of the shutter-operating plate as it swings toward the limit of its movement in one direction.

2. In a camera, a shutter-operating plate arranged to swing in an inclosed space and means for regulating the escape of air from the space as the plate swings in one direction thereby regulating the speed of the plate and forming a pneumatic cushion therefor.

3. In a camera, a shutter-operating plate arranged to swing in an inclosed space therein and means for regulating the escape of air from the space as the plate is swung in one direction, comprising coacting perforated stationary and rotary cylinders.

4. In a camera, a shutter-operating plate arranged to swing in an inclosed space therein and means for regulating the escape of air from the space as the plate is swung in one direction comprising coacting perforated stationary and rotary cylinders located within the camera and an operating-handle for the rotary cylinder exterior to the camera.

In testimony that I claim the foregoing as my invention I have signed my name, in presence of two witnesses, this 31st day of December, 1902.

GASSNER F. FRALEY.

Witnesses:
FREDK. HAYNES,
HENRY THIEME.